US012032237B2

(12) United States Patent
Shao et al.

(10) Patent No.: US 12,032,237 B2
(45) Date of Patent: Jul. 9, 2024

(54) DISPLAY PANELS AND DISPLAY APPARATUSES

(71) Applicants: Beijing BOE Display Technology Co., Ltd., Beijing (CN); BOE Technology Group Co., Ltd., Beijing (CN)

(72) Inventors: Xibin Shao, Beijing (CN); Xiaona Liu, Beijing (CN); Rui Zhang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/211,008

(22) Filed: Jun. 16, 2023

(65) Prior Publication Data

US 2023/0333425 A1 Oct. 19, 2023

Related U.S. Application Data

(63) Continuation-in-part of application No. 17/186,955, filed on Feb. 26, 2021, now abandoned.

(30) Foreign Application Priority Data

Jun. 15, 2023 (CN) ............................ 202310710760

(51) Int. Cl.
*G02F 1/1335* (2006.01)
*G02F 1/1339* (2006.01)
*G02F 1/1343* (2006.01)

(52) U.S. Cl.
CPC ...... *G02F 1/133514* (2013.01); *G02F 1/1339* (2013.01); *G02F 1/134336* (2013.01)

(58) Field of Classification Search
CPC ................................................. G02F 1/133514
See application file for complete search history.

(56) References Cited

U.S. PATENT DOCUMENTS

2015/0331292 A1 11/2015 Yang et al.
2016/0011456 A1 1/2016 Wang et al.
(Continued)

FOREIGN PATENT DOCUMENTS

CN 104090428 A 10/2014
CN 107621721 A 1/2018
(Continued)

OTHER PUBLICATIONS

CN2020101933711 first office action.
(Continued)

*Primary Examiner* — Edmond C Lau
(74) *Attorney, Agent, or Firm* — IPro, PLLC

(57) ABSTRACT

A display panel and a display apparatus. The display panel includes an array substrate and a color filter substrate opposite to each other, the array substrate being provided with a plurality of pixel regions arranged in an array, and the pixel regions closest to corners of the array substrate being first-type pixel regions, where the color filter substrate includes: a base substrate; a sealant between the base substrate and the array substrate; and a color filter layer on the base substrate and including a plurality of filter units, where the filter units includes first filter units corresponding to the first-type pixel regions, a portion of an orthographic projection of the first filter unit onto the base substrate facing a corner of the base substrate has a non-right-angle contour, and orthographic projections of the first filter unit and the sealant onto the base substrate do not overlap with each other.

18 Claims, 10 Drawing Sheets

(56) References Cited

U.S. PATENT DOCUMENTS

2016/0320646 A1* 11/2016 Lee .................. G02F 1/134336
2018/0143486 A1* 5/2018 Kadowaki ......... G02F 1/133514
2021/0294149 A1* 9/2021 Shao .................... G02F 1/1339

FOREIGN PATENT DOCUMENTS

CN 208689324 U 4/2019
CN 110673402 A 1/2020
JP 2017503219 A 1/2017
KR 20110038986 A 4/2011

OTHER PUBLICATIONS

CN2020101933711 second office action.
CN2020101933711 third office action.
CN2020101933711 Decision of Rejection.
U.S. Appl. No. 17/186,955 non-final office action dated Jun. 24, 2021.
U.S. Appl. No. 17/186,955 final office action dated Sep. 30, 2021.
U.S. Appl. No. 17/186,955 Advisory Action dated Dec. 7, 2021.
U.S. Appl. No. 17/186,955 non-final office action dated Jan. 21, 2022.
U.S. Appl. No. 17/186,955 final office action dated Jul. 5, 2022.
U.S. Appl. No. 17/186,955 non-final office action dated Oct. 14, 2022.
U.S. Appl. No. 17/186,955 final office action dated Mar. 16, 2023.

* cited by examiner

DISPLAY PANELS AND DISPLAY APPARATUSES

TECHNICAL FIELD

This application relates to the field of display technology, and in particular to a display panel and a display apparatus.

BACKGROUND

Liquid Crystal Displays (LCDs) generally include an array substrate and a color filter substrate, and the array substrate and the color filter substrate are bonded together by a sealant. Due to process limitations, the sealant is in an arc shape at corners thereof.

Pixels of a conventional color filter substrate are usually designed in a rectangular shape and arranged in an array to form a rectangular display area. This leads to a very high risk that a color filter layer of the color filter substrate overlaps with the sealant at a corner region of the display area, while the color filter layer does not overlap with the sealant at a non-corner region of the display area. This will easily cause a thickness of film layers between the array substrate and the color filter substrate at the corner region to be greater than a thickness of the film layers at the non-corner region, which leads to uneven support at peripheral regions between the array substrate and the color filter substrate, resulting in yellowing at four corners of the display.

SUMMARY

According to a first aspect of embodiments of the present application, there is provided a display panel, including an array substrate and a color filter substrate disposed opposite to each other, the array substrate being provided with a plurality of pixel regions arranged in an array, and the pixel regions closest to corners of the array substrate among the plurality of pixel regions being first-type pixel regions, where the color filter substrate includes:

- a base substrate;
- a sealant between the base substrate and the array substrate, an orthographic projection of the sealant onto the array substrate at least partially overlapping with the first-type pixel regions; and
- a color filter layer on the base substrate and including a plurality of filter units disposed corresponding to the plurality of pixel regions, where the filter units includes first filter units corresponding to the first-type pixel regions, and for each of the first filter units, a portion of an orthographic projection of the first filter unit onto the base substrate facing a corner of the base substrate has a non-right-angle contour, and the orthographic projection of the first filter unit onto the base substrate does not overlap with an orthographic projection of the sealant onto the base substrate.

Further, the portion of the orthographic projection of the first filter unit onto the base substrate facing the corner of the base substrate is a curve segment.

Further, the portion of the orthographic projection of the first filter unit onto the base substrate facing the corner of the base substrate is an arc segment with a constant curvature.

Further, the arc segment has a radius of curvature greater than or equal to 0.5 mm and less than or equal to 5 mm.

Further, a central angle corresponding to the arc segment is 90°.

Further, the portion of the orthographic projection of the first filter unit onto the base substrate facing the corner of the base substrate is a line segment with a constant slope.

Further, the slope is 1.

Further, each of the filter units includes a first filter, a second filter, and a third filter, the first filter being made of a first color resist material, the second filter being made of a second color resist material, and the third filter being made of a third color resist material; and a connecting portion is disposed between at least some of adjacent filter units, and the connecting portion is made of the first color resist material.

Further, the first color resist material has a higher stability than the second color resist material and the third color resist material.

Further, the connecting portion and the first filter are arranged in a same layer.

Further, the filter units includes second filter units which are not corresponding to the first-type pixel regions, and a structure formed by the connecting portion and corresponding first filters surrounds the second filter and the third filter in a corresponding second filter unit.

Further, a minimum distance between the first filter unit and the sealant is greater than or equal to a minimum distance between the second filter unit and the sealant.

Further, a part of the orthographic projection of the sealant onto the array substrate overlapping with the first-type pixel regions has a curve segment.

Further, there are a plurality of connecting portions arranged at intervals in a first direction, each of which extends in a second direction, where an angle is formed between the first direction and the second direction; and among the plurality of connecting portions, the connecting portions closest to edges of the base substrate are edge connecting portions, and other connecting portions are non-edge connecting portions.

Further, the color filter substrate further includes a shading layer formed on the base substrate, and at least part of the color filter layer and the sealant are formed on the shading layer; and a dimension of an overlapping area of an orthographic projection of each of the edge connecting portions onto the base substrate with an orthographic projection of the shading layer onto the base substrate in the first direction is no more than a dimension of an overlapping area of an orthographic projection of each of the non-edge connecting portions onto the base substrate with the orthographic projection of the shading layer onto the base substrate in the first direction.

Further, the color filter substrate further includes a shading layer formed on the base substrate, and at least part of the color filter layer and the sealant are formed on the shading layer; and a plurality of hollowed-out regions arranged in an array are provided in the shading layer, and a sum of areas of orthographic projections of the plurality of hollowed-out regions onto the base substrate is smaller than a sum of areas of orthographic projections of the plurality of filter units onto the base substrate.

Further, the color filter substrate further includes a shading layer formed on the base substrate, and at least part of the color filter layer and the sealant are formed on the shading layer; each of the filter units includes a plurality of filters, and among the plurality of filters, the filters closest to edges of the base substrate are edge filters, and other filters are non-edge filters; and an overlapping area between an orthographic projection of each of the edge filters onto the base substrate and an orthographic projection of the shading layer onto the base substrate is greater than an overlapping area between an orthographic projection of each of the non-edge filters onto the base substrate and the orthographic projection of the shading layer onto the base substrate.

According to a second aspect of embodiments of the present application, there is provided a display apparatus including the display panel as described above.

With the embodiments of the present application, the following beneficial technical effects can be produced.

With the display panel and the display apparatus according to the embodiments of the present application, a shape of the color filter layer at the corner region of the display area is designed such that the color filter layer at the corner region is spaced apart from the sealant, which can prevent the sealant from overlapping with the color filter layer at the corner region, thus ensuring uniform thickness and relatively even support at the sealant after the color filter substrate and the array substrate are bonded. As a result, yellowing at four corners of the display panel can be avoided while achieving a narrow frame.

Additional aspects and advantages of the present application will be set forth in part in the following description, and will become apparent from the following description, or be learned by practice of the present application.

BRIEF DESCRIPTION OF DRAWINGS

In order to more clearly illustrate embodiments of the present disclosure, the drawings to be used in the description of the embodiments will be briefly introduced below. It will be apparent that the drawings in the following description merely illustrate some embodiments of the present disclosure. For those ordinary skilled in the art, other drawings may be obtained from these drawings without any creative efforts.

DESCRIPTION OF REFERENCE SIGNS

1—color filter substrate
101—base substrate
102—color filter layer
1021—filter unit
1022—first filter unit
1023—second filter unit
1024—filter
1025—edge filter
1026—non-edge filter
1027—connecting portion
R—first filter
G—second filter
B—third filter
103—shading layer
1031—first shading structure
1032—second shading structure
104—planarization layer
2—sealant
3—array substrate
31—pixel region
311—first-type pixel region
312—second-type pixel region
32—sub-pixel region
33—corner
4—drive circuit
10*a*—first side
10*b*—second side
I—first display panel
II—second display panel

DETAILED DESCRIPTION

The present application will be described in detail below. Examples of embodiments of the present application are illustrated in the accompanying drawings, in which the same or like reference signs indicate the same or like components or components with the same or like functions throughout. In addition, if a detailed description of known technology is unnecessary for the illustrated features of the present application, it will be omitted. Embodiments described below with reference to the drawings are exemplary, are intended only to explain the present application, and are not to be construed as limiting the present application.

Those skilled in the art can understand that, unless otherwise defined, all terms including technical terms and scientific terms used herein have the same meanings as those commonly understood by those ordinary skilled in the art to which the present application pertains. It should also be understood that terms such as those defined in general dictionaries should be understood to have meanings consistent with their meanings in the context of the related art, and are not to be interpreted in an idealized or overly formal sense unless specifically defined as such herein.

Those skilled in the art can understand that, the singular forms “a”, “an”, “said” and “the” used herein may also include the plural forms, unless expressly stated otherwise. It should be further understood that the terms “include” and/or “including,” when used in the specification of the present application, specify the presence of stated features, integers, steps, operations, elements, and/or components, but do not preclude the presence or addition of one or more other features, integers, steps, operations, elements, components, and/or groups thereof.

Figure 1:
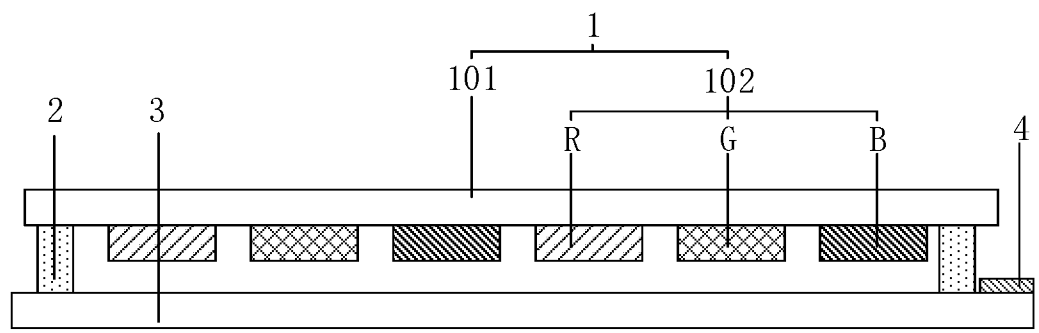
FIG. 1 is a schematic diagram illustrating a cross-sectional structure of a display panel according to an embodiment of the present application.

This embodiment provides a display panel. As shown in FIG. 1, the display panel includes an array substrate 3, a color filter substrate 1, and a sealant 2 between the array substrate and the color filter substrate. The sealant is used to bond the array substrate and the color filter substrate to form a closed cell structure for accommodating liquid crystal molecules.

In particular, the display panel according to this embodiment further includes a drive circuit 4 bound onto the array substrate to provide drive signals for the display panel. It should be noted that the drive circuit 4 may be a drive chip, a flexible circuit board, or the like.

Figure 2:
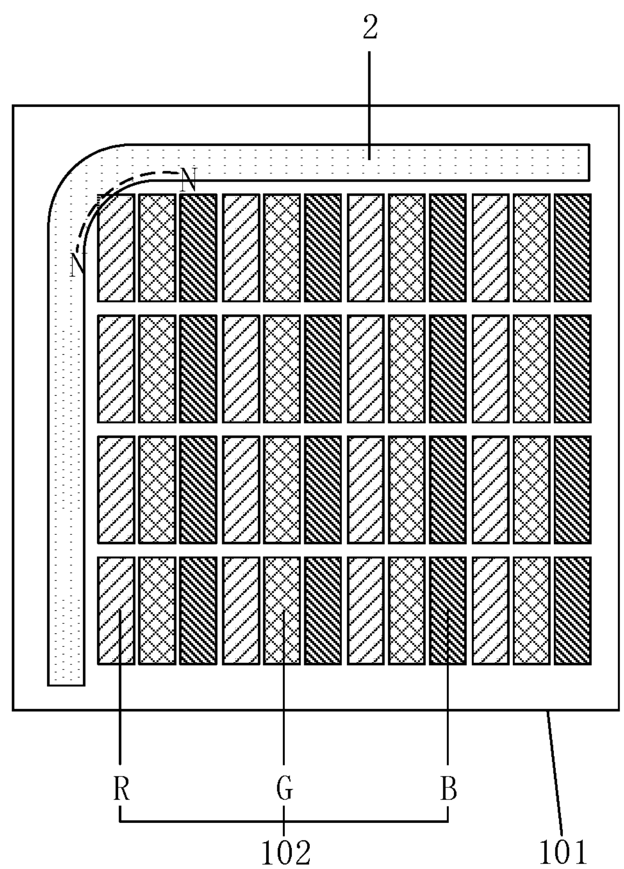
FIG. 2 is a partial schematic diagram illustrating a color filter substrate in the related art.
Figure 3:
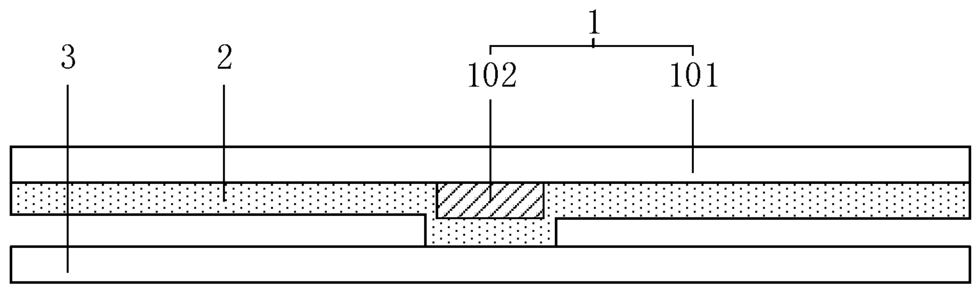
FIG. 3 is a cross-sectional view taken along line N-N in FIG. 2.

As shown in FIGS. 2 and 3, the inventors of the present application considered that, during a cell-assembling process of the array substrate 3 and the color filter substrate 1 with the sealant 2, the sealant is in an arc shape at corners of the corresponding array substrate or color filter substrate due to limitations of a coating process, while the planar outer contours of the array substrate 3 and the color filter substrate 1 are generally rectangular, and the outer contours of all pixel regions are also generally rectangular. In this case, a color filter layer 102 of the color filter substrate may interfere with the arc-shaped region of the sealant at the corners. As a result, a thickness of various film layers between the array substrate 3 and the color filter substrate 1 in the arc-shaped region of the sealant is greater than a thickness of the various film layers between the array substrate 3 and the color filter substrate 1 in other regions of the sealant, which leads to uneven cell thickness between the array substrate 3 and the color filter substrate 1, resulting in yellowing at four corners of the display.

In view of the above, embodiments of the present application provide a display panel and a display apparatus.

Figure 4:
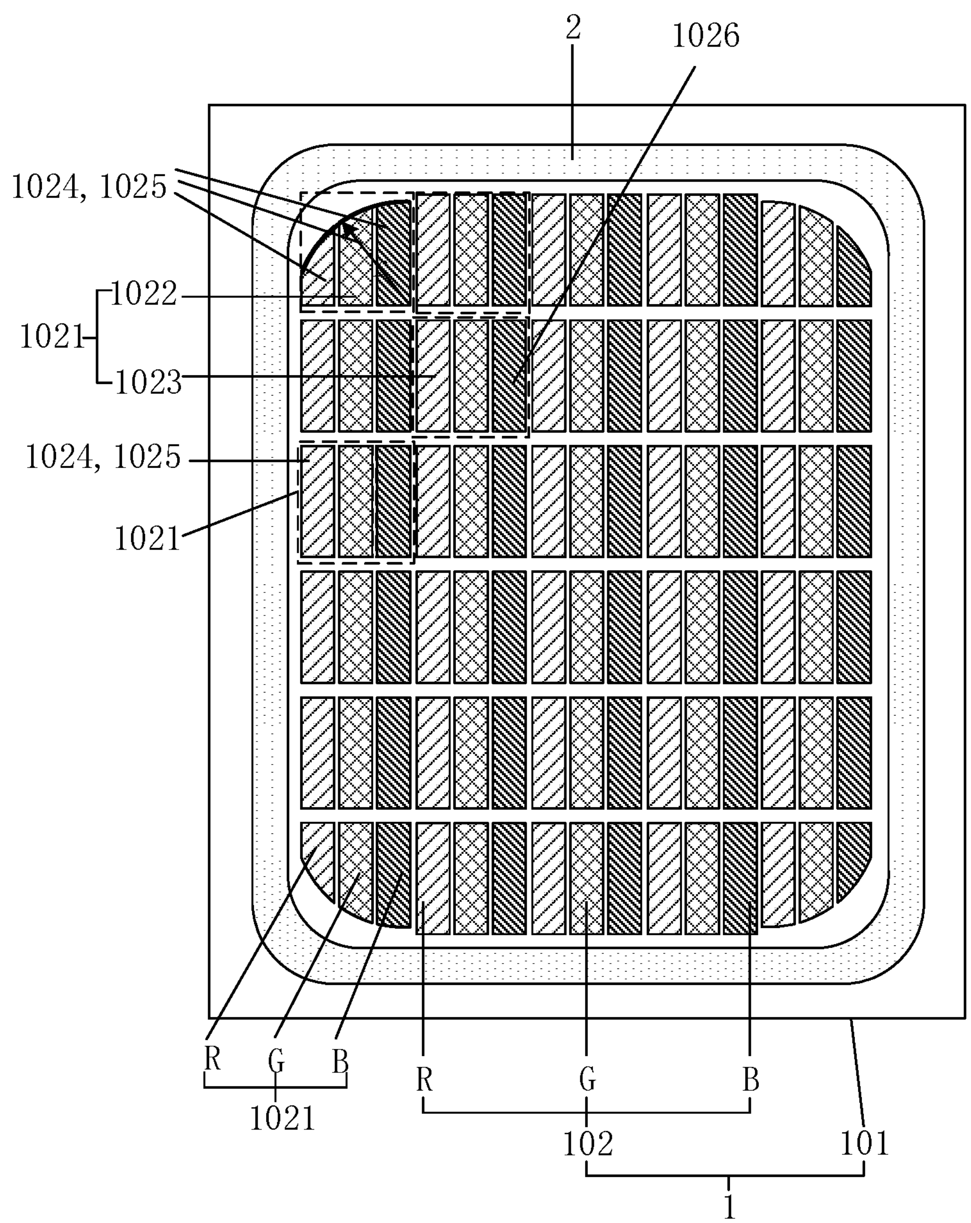
FIG. 4 is a schematic top view illustrating a structure of a color filter substrate according to an embodiment of the present application.
Figure 5:
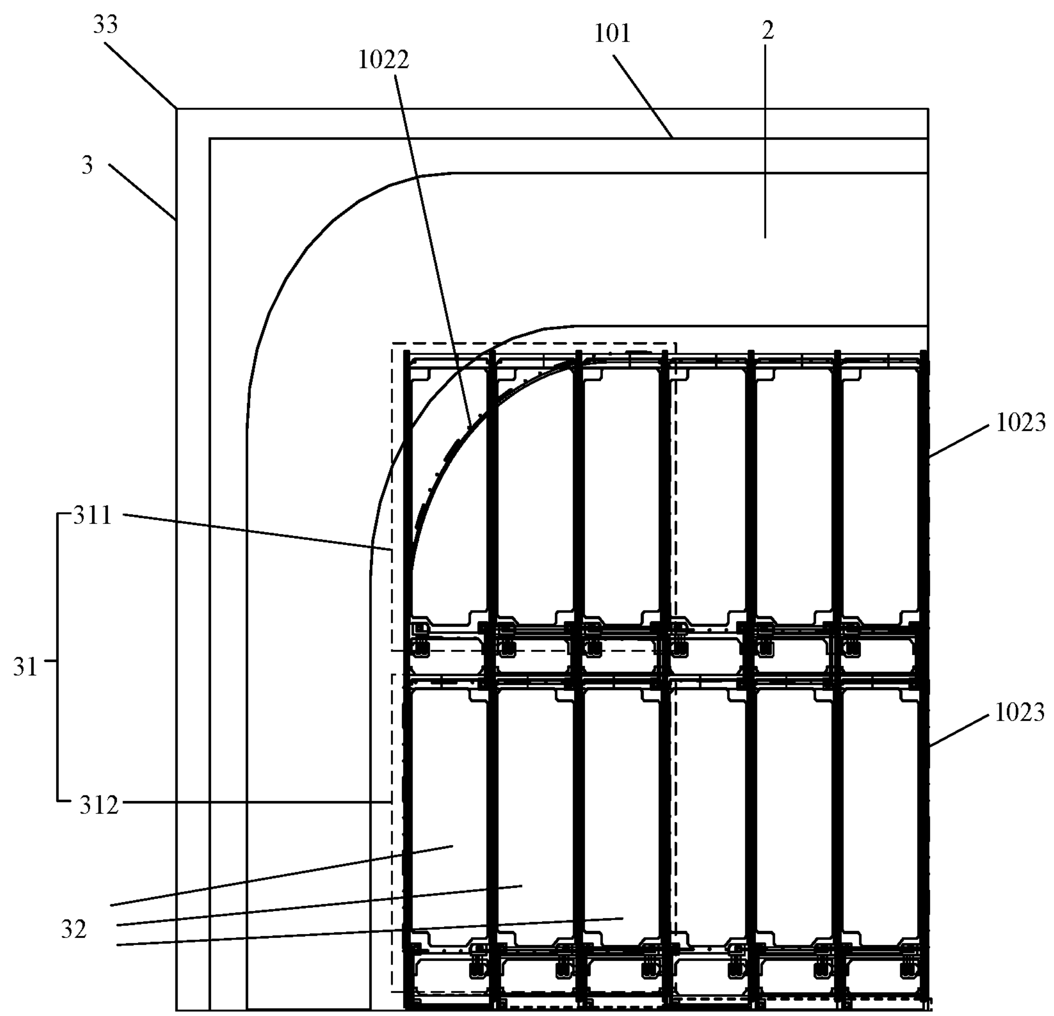
FIG. 5 is a schematic top view illustrating a partial structure of a color filter substrate according to an embodiment of the present application.

As shown in FIGS. 1, 4 and 5, the present embodiment provides a display panel. The display panel includes the array substrate 3, the color filter substrate 1, and the sealant 2 between the array substrate 3 and the color filter substrate 1. The color filter substrate 1 includes a base substrate 101, the sealant 2, and a color filter layer 102. The array substrate 3 is provided with a plurality of pixel regions 31 arranged in an array, where the pixel regions 31 closest to corners 33 of the array substrate 3 are first-type pixel regions 311, and other pixel regions 31 are second-type pixel regions 312. The sealant 2 is provided between the base substrate 101 and the array substrate 3 to bond the color filter substrate 1 with the array substrate 3. At least a part of an orthographic projection of the sealant 2 onto the array substrate 3 overlaps with the first-type pixel regions 311. In other words, the orthographic projection of the sealant 2 onto the array substrate 3 at least partially overlaps with the first-type pixel regions 311. The color filter layer 102 is provided on the base substrate 101. The color filter layer 102 includes a plurality of filter units 1021 corresponding to the pixel regions 31. The filter unit 1021 corresponding to the first-type pixel region 311 is a first filter unit 1022, and the filter unit 1021 which is not corresponding to the first-type pixel region 311 is a second filter unit 1023. A portion of an orthographic projection of the first filter unit 1022 onto the base substrate 101 facing a corner of the base substrate 101 has a non-right-angle contour, and the orthographic projection of the first filter unit 1022 onto the base substrate 101 does not overlap with an orthographic projection of the sealant 2 onto the base substrate 101.

As above, portions of the color filter layer 102 corresponding to the first-type pixel regions 311 are spaced apart from the sealant 2, which can prevent the sealant 2 from overlapping with the color filter layer 102 at the corner region, thus ensuring uniform thickness and relatively even support at the sealant 2 after the color filter substrate 1 and the array substrate 3 are bonded. As a result, yellowing at four corners of the display panel can be avoided while achieving a narrow frame.

In this embodiment, the minimum distance between the first filter unit 1022 and the sealant 2 is greater than or equal to the minimum distance between the second filter unit 1023 and the sealant 2. When the minimum distance between the first filter unit 1022 and the sealant 2 is greater than or equal to the minimum distance between the second filter unit 1023 and the sealant 2, it can be ensured that the first filter unit 1022 may not overlap with the sealant 2 in thickness, thus ensuring uniform thickness and relatively even support at the sealant 2 after the color filter substrate 1 and the array substrate 3 are bonded.

In addition, the part of the orthographic projection of the sealant 2 onto the array substrate 3 overlapping with the first-type pixel region has a curve segment, so as to ensure that the first filter unit 1022 can keep a relatively uniform and reasonable distance therefrom, thereby ensuring that the first filter unit 1022 does not overlap with the sealant 2 in thickness.

As shown in FIG. 4 and, if necessary, in conjunction with FIG. 5, in the present application, the portion of the orthographic projection of the first filter unit 1022 onto the base substrate 101 facing the corner of the base substrate 101 is a curve segment. In this way, the first filter unit 1022 can transition smoothly at the corner, such that the structure stability can be ensured.

Further, the portion of the orthographic projection of the first filter unit 1022 onto the base substrate 101 facing the corner of the base substrate 101 is an arc segment with a constant curvature. In this way, it can be ensured that the first filter unit 1022 can transition more smoothly at the corner.

With continued reference to FIG. 4 and FIG. 5, each pixel region 31 includes a plurality of sub-pixel regions 32. The filter unit 1021 includes a plurality of filters 1024 corresponding to the sub-pixel regions 32. The first filter unit 1022 includes a plurality of filters 1024. Portions of orthographic projections of the plurality of filters 1024 onto the base substrate 101 facing the corner of the base substrate 101 are arc segments with the same curvature. In the above, edges of the plurality of filters 1024 in the first filter unit 1022 are arc segments with the same curvature, that is, the edges of the plurality of filters 1024 in the first filter unit 1022 can be smoothly connected to improve the structure stability. It should be noted that each of the sub-pixel regions 32 may emit light independently. However, multiple or all of the pixel regions 31 may emit light as a whole, and a liquid crystal layer is provided on the color filter layer 102, and the deflection of the liquid crystal layer may be controlled to control whether light reaches the filter unit 1021.

Further, the inventors found that when a radius of curvature of the arc segment is too small, the color filter layer 102 cannot be effectively prevented from overlapping with the sealant 2. When the radius of curvature of the arc segment is too large, user's visual experience may be affected to a certain extent. The inventors have determined through a large number of experiments that when the radius of curvature r of the arc segment is greater than or equal to 0.5 mm and less than or equal to 5 mm, the above problems can be better balanced, such that the color filter substrate 1 according to this embodiment can effectively prevent the color filter layer 102 from overlapping with the sealant 2 without affecting the display effect.

Furthermore, a central angle corresponding to the arc segment is 90°, so as to enable a smooth transition between edges of the first filter unit 1022 and the second filter unit 1023 on the periphery of the first filter unit 1022.

Figure 6:
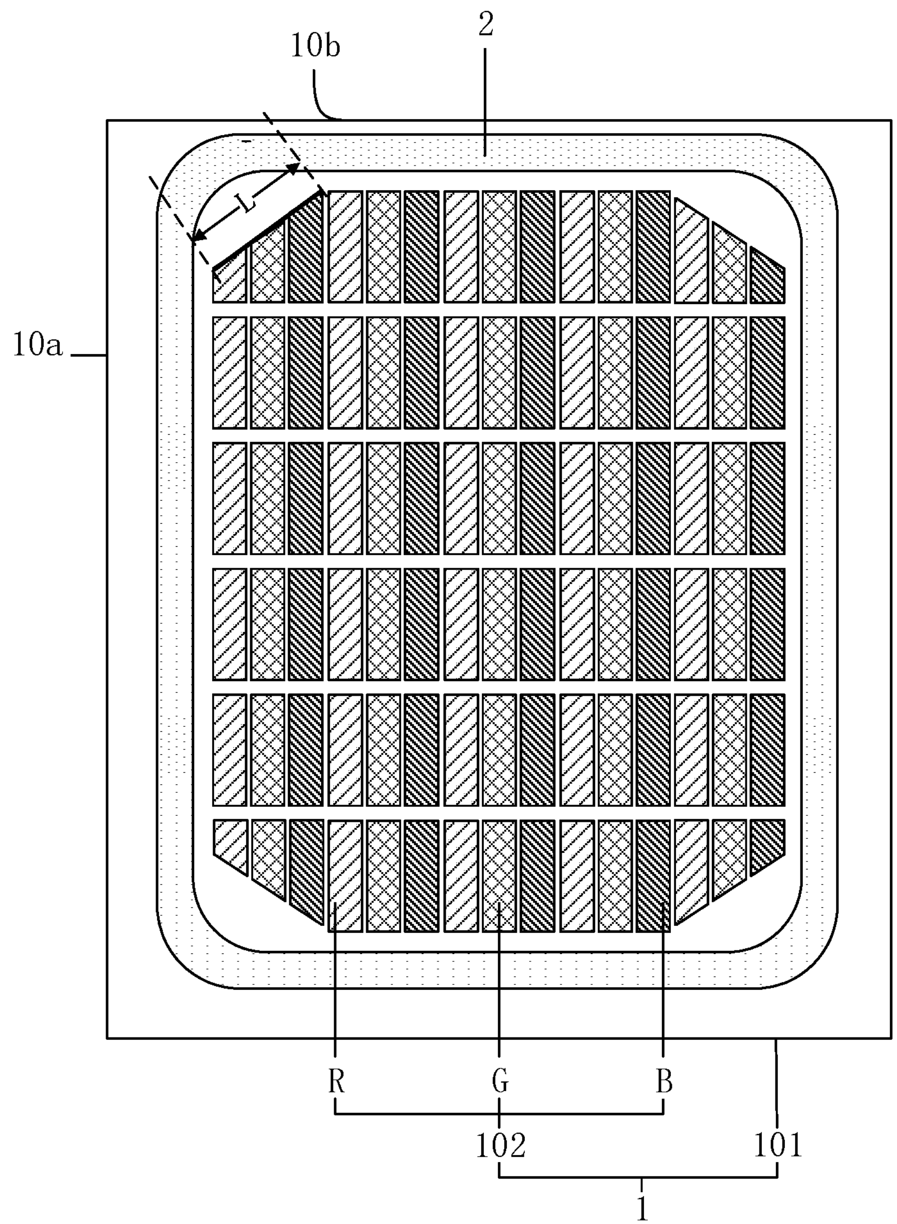
FIG. 6 is a schematic top view illustrating a structure of a color filter substrate according to another embodiment of the present application.

However, as shown in FIG. 6 and, if necessary, in conjunction with FIG. 5, in other embodiments, the portion of the orthographic projection of the first filter unit 1022 onto the base substrate 101 facing the corner of the base substrate 101 is a line segment with a constant slope. Alternatively, the portion of the orthographic projection of the first filter unit 1022 onto the base substrate 101 facing the corner of the base substrate 101 may be another line segment that is relatively flat compared to a right angle.

When the portion of the orthographic projection of the first filter unit 1022 onto the base substrate 101 facing the corner of the base substrate 101 is a line segment with a constant slope, portions of the orthographic projections of the plurality of filters 1024 in the first filter unit 1022 onto the base substrate 101 facing the corner of the base substrate 101 are line segments with the same slope, which may be connected with each other to form a smooth line segment. For example, in this embodiment, the slope is 1. It can be understood that the base substrate 101 includes a first side 10*a* and a second side 10*b* which are adjacent to each other, and an orthographic projection of the color filter layer 102 onto the base substrate 101 is an oblique line segment at the corner of the first side 10*a* and the second side 10*b*, where the oblique line segment forms an angle of 45° with both the first side 10*a* and the second side 10*b*. Moreover, in the embodiment of FIG. 6, the oblique line segment has a length L of 0.5 mm to 8 mm.

Figure 7:
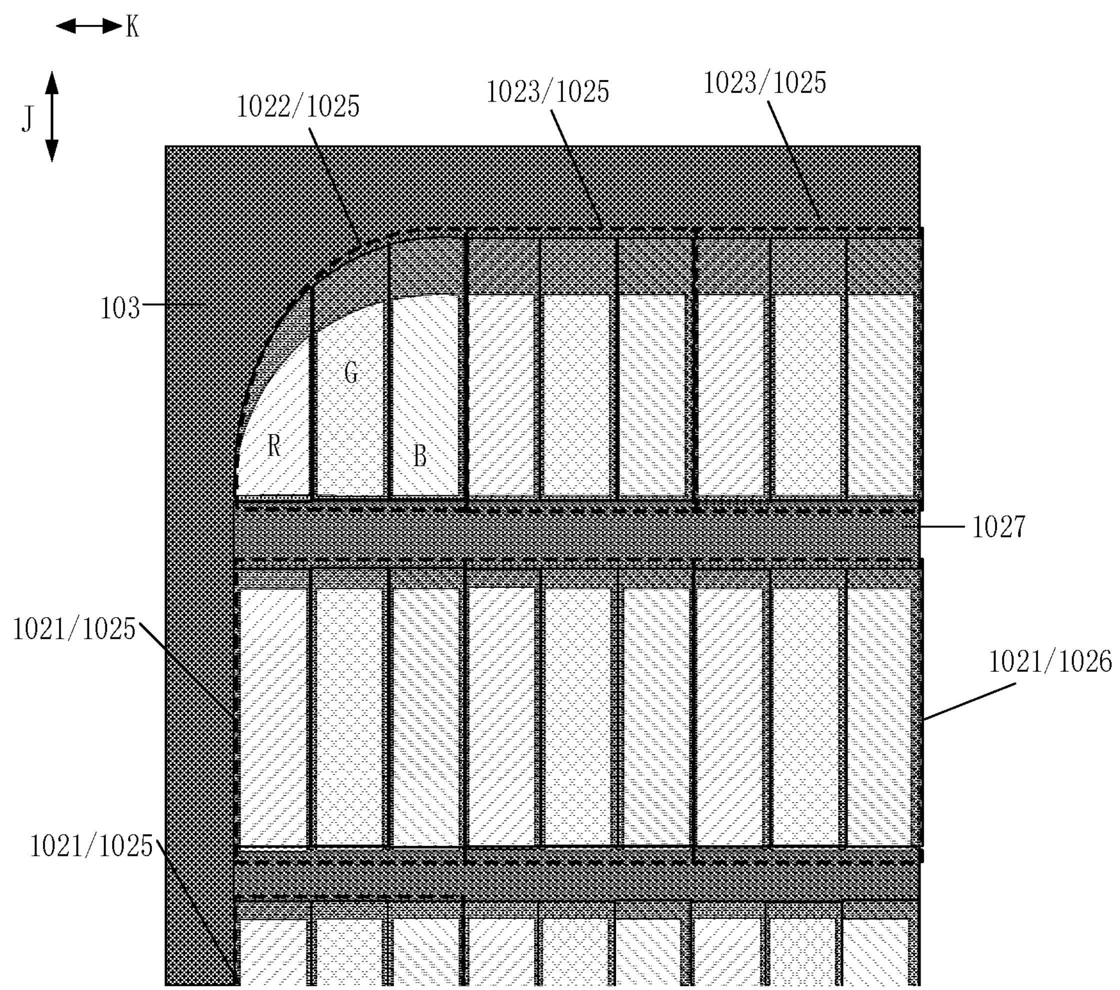
FIG. 7 is a schematic top view illustrating a part of a structure of a color filter substrate according to an embodiment of the present application during a preparation process.

As shown in FIG. 4 and FIG. 7, the filter unit 1021 includes a first filter R, a second filter G, and a third filter B. The first filter R is made of a first color resist material, the second filter G is made of a second color resist material, and the third filter B is made of a third color resist material. A connecting portion 1027 is disposed between at least some of adjacent filter units 1021, and the connecting portion 1027 is made of the first color resist material. In the present application, the connecting portion 1027 is disposed between adjacent filter units 1021 in a first direction J. In other words, the connecting portion 1027 extends in a second direction K. Moreover, there are a plurality of connecting portions 1027 which are arranged at intervals in the first direction J. There is an angle between the first direction J and the second direction K. It should be noted that, in this embodiment, the first direction J is a column direction, the second direction K is a row direction, and an angle between the first direction J and the second direction K is 90°. In other embodiments, the angle between the first direction J and the second direction K may be an obtuse angle or an acute angle. Alternatively, the connecting portion 1027 may be disposed between adjacent filter units 1021 in the second direction K. The color filter substrate 1 further includes a shading layer 103 formed on the base substrate 101. At least portions of the first filter R, the second filter G, and the third filter B are formed on the shading layer 103. The shading layer 103 can avoid light leakage between adjacent filter units 1021 and between adjacent filters 1024. In this embodiment, the shading layer 103 includes a first shading structure 1031 and a second shading structure 1032, the first shading structure 1031 being located in the display area, and the second shading structure 1032 being located in the non-display area.

Figure 9:
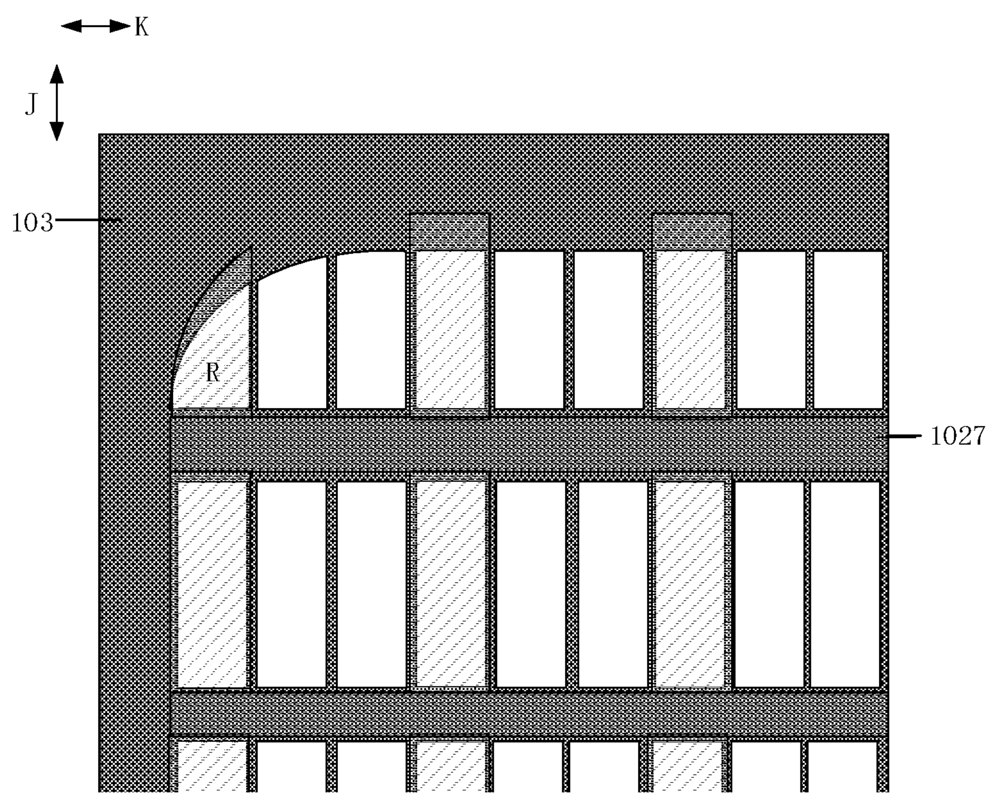
FIG. 9 is a schematic top view illustrating yet another part of a structure of a color filter substrate according to an embodiment of the present application during a preparation process.
Figure 10:
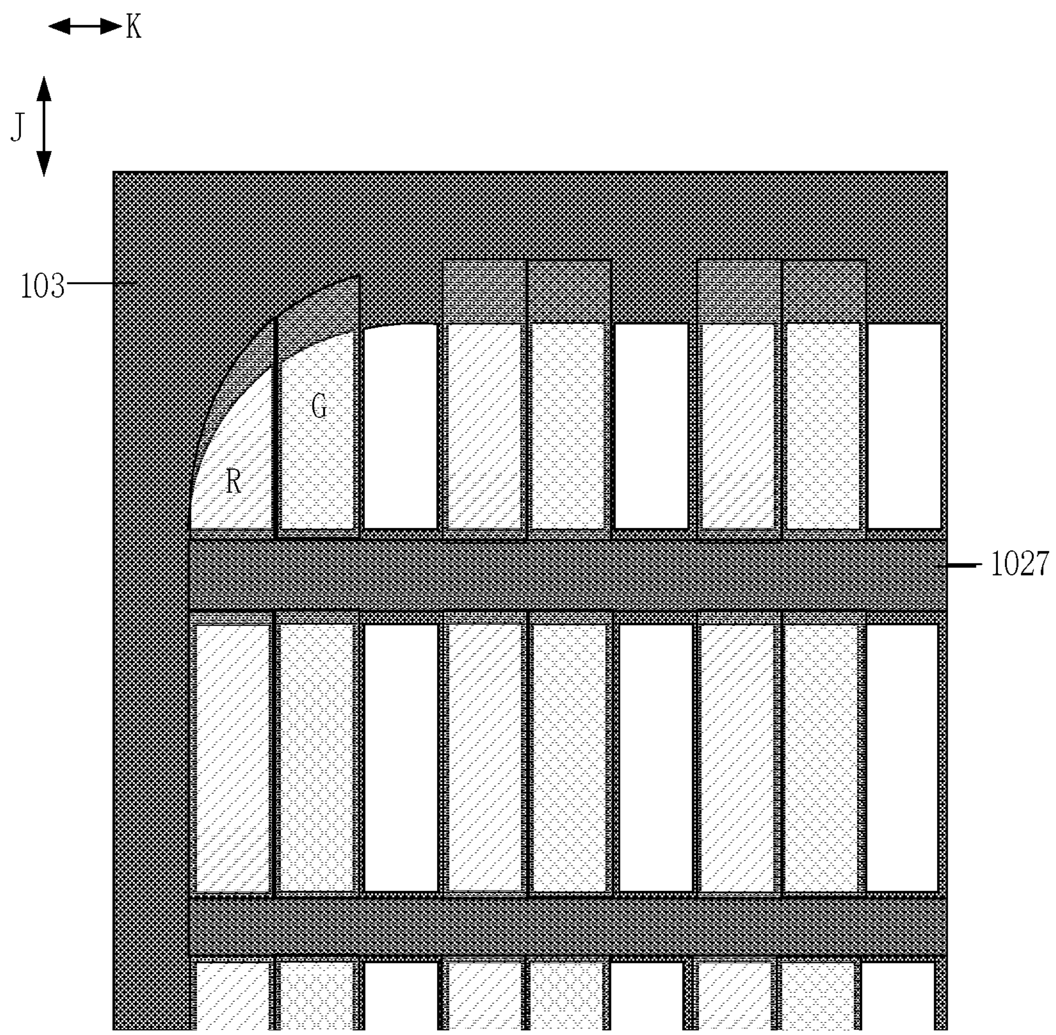
FIG. 10 is a schematic top view illustrating still another part of a structure of a color filter substrate according to an embodiment of the present application during a preparation process.
Figure 11:
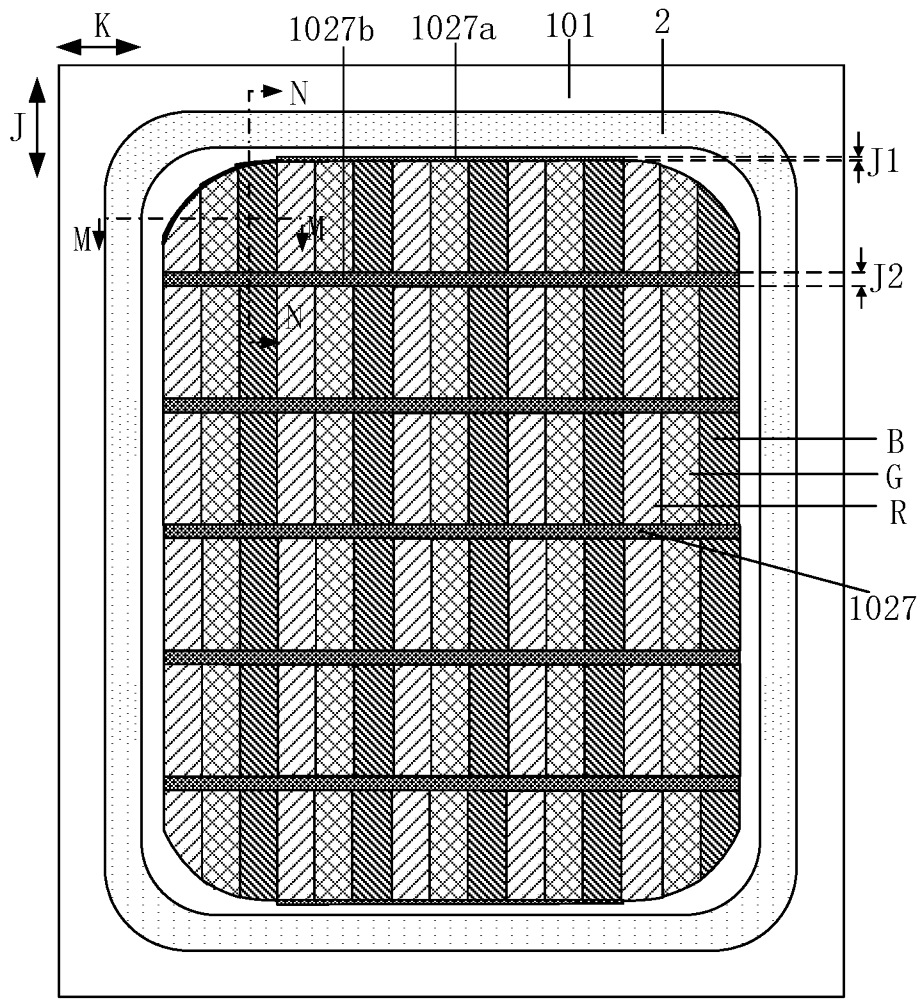
FIG. 11 is a schematic top view illustrating a structure of a color filter substrate according to yet another embodiment of the present application.
Figure 12:
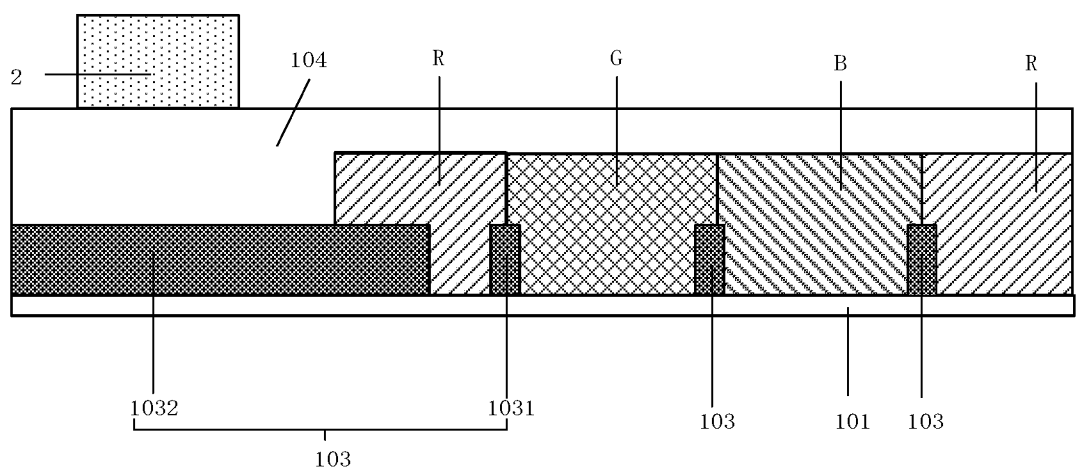
FIG. 12 is a schematic cross-sectional view illustrating a color filter substrate shown in FIG. 11 along line M-M.
Figure 13:
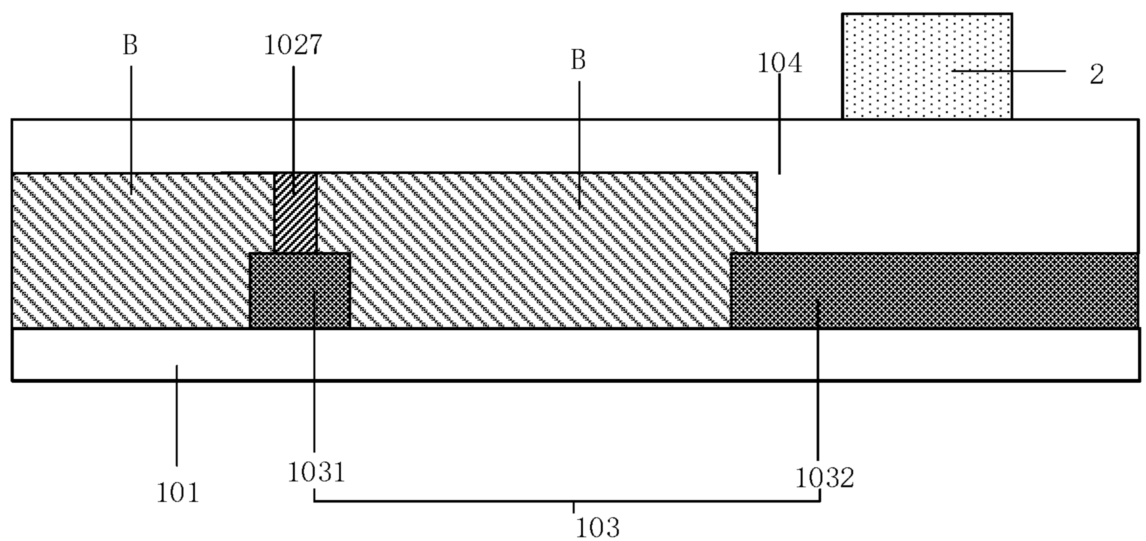
FIG. 13 is a schematic cross-sectional view illustrating a color filter substrate shown in FIG. 11 along line N-N.

As shown in FIG. 11 and, if necessary, in conjunction with FIGS. 7-10, the connecting portions 1027 closest to the edge of the base substrate 101 are edge connecting portions 1027*a*, and the other connecting portions 1027 are non-edge connecting portions 1027*b*. A dimension J1 of an overlapping area of an orthographic projection of any one of the edge connecting portions 1027*a* onto the base substrate 101 with an orthographic projection of the shading layer 103 onto the base substrate 101 in the first direction J is no more than a dimension J2 of an overlapping area of an orthographic projection of the non-edge connecting portion 1027*b* onto the base substrate 101 with the orthographic projection of the shading layer 103 onto the base substrate 101 in the first direction J. The dimension of the non-edge connecting portion 1027*b* in the first direction J is made larger to better connect the filter units 1021 disposed adjacent to each other in the first direction J.

Figure 8:
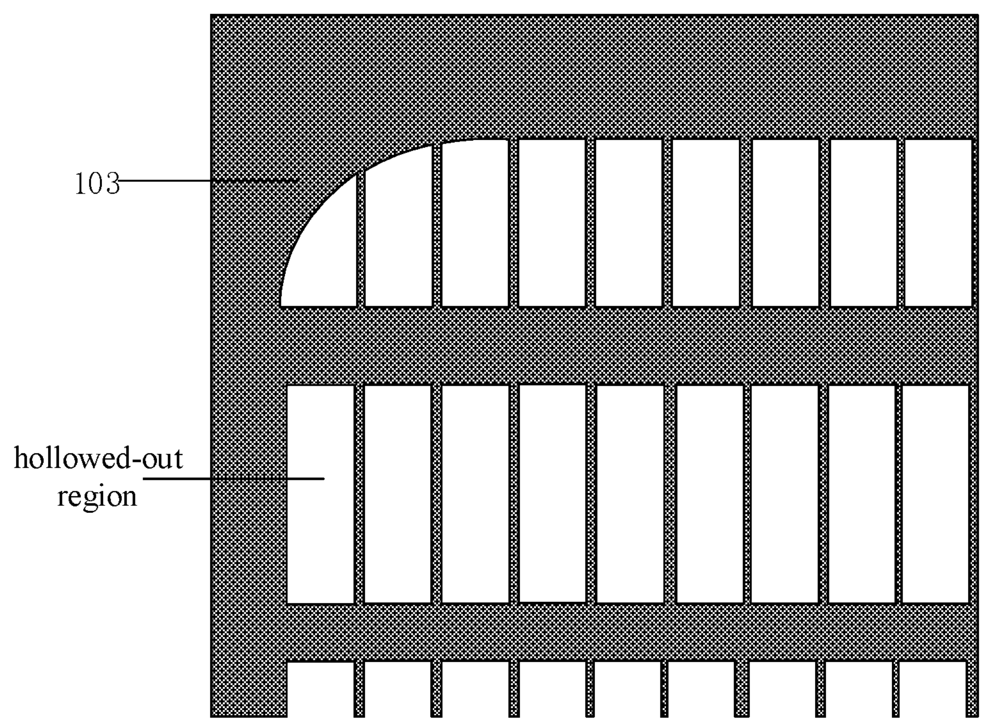
FIG. 8 is a schematic top view illustrating another part of a structure of a color filter substrate according to an embodiment of the present application during a preparation process.

During the process of preparing the color filter substrate 1, the shading layer 103 may be prepared first. The shading layer 103 is patterned to obtain a number of hollowed-out regions arranged in an array at designated positions, where the hollowed-out regions are configured to be filled with a color resist material. The structure obtained at this point is shown in FIG. 8. After that, a first color resist material is applied on the shading layer 103, with a part of the first color resist material being formed on the shading layer 103, and another part of the first color resist material entering into the hollowed-out regions. Then, portions of the film layer formed of the first color resist material where the second filters G and the third filters B are to be formed are etched, so as to expose part of the hollowed-out regions corresponding to the second filters G and the third filters B. A plurality of first filters R and connecting portions 1027 are finally obtained. The structure obtained at this point is shown in FIG. 9. Subsequently, a second color resist material and a third color resist material are sequentially filled to form the second filters G and the third filters B. Part of structures of the second filters G and the third filters B are located on the shading layer 103, and another part of the structures enter into the hollowed-out regions. The structures obtained at this point are shown in FIG. 10 and FIG. 7. As above, the plurality of filters 1024 are connected by the connecting portions 1027 formed of the first color resist material, thereby improving the surface flatness of the color filter substrate 1, and thus the surface flatness of the display panel. It should be noted that, in this embodiment, the connecting portions 1027 and the first filters R are formed in the same layer. It can be understood that the connecting portions 1027 and the first filters R may be prepared in the same film-forming or patterning process; and/or the connecting portions 1027 are in direct contact with the first filters R; and/or a distance between a surface of the connecting portions 1027 close to the array substrate 3 and the array substrate 3 is the same as a distance between a surface of the first filters R close to the array substrate 3 and the array substrate 3, and a distance between a surface of the connecting portions 1027 away from the array substrate 3 and the array substrate 3 is the same as a distance between a surface of the first filters R away from the array substrate 3 and the array substrate 3.

However, in other embodiments, the connecting portions 1027 and the first filters R may be formed in different layers.

In this embodiment, as shown in FIGS. 8 to 13, the structure formed by the connecting portions 1027 and the first filters R surrounds the second filter G and the third filter B in the second filter unit 1023. In this way, the surface formed by the connecting portions 1027, the first filters R, the second filters G, and the third filters B is flat, thereby improving the surface flatness of the color filter substrate 1, and thus the surface flatness of the display panel. It should be noted that, a planarization layer 104 is further formed at an end of the shading layer 103, the first filters R, the second filters G, and the third filters B away from the base substrate 101 to improve the surface flatness of the color filter substrate.

Furthermore, the first color resist material has a higher stability than the second color resist material and the third color resist material. In this embodiment, the first filter R is a red filter, the second filter G is a green filter, and the third filter B is a blue filter. Accordingly, the first color resist material is a red color resist material, the second color resist material is a green color resist material, and the third color resist material is a blue color resist material. The red color resist material has a higher stability than the green color resist material and the blue color resist material. In the above, the color resist material with a high stability is used to obtain the connecting portions 1027, thereby improving the reliability and stability of the display effect, and avoiding problems such as uneven color and yellowing.

With continued reference to FIGS. 7 to 13, the sum of areas of orthographic projections of the plurality of hollowed-out regions onto the base substrate 101 is smaller than the sum of areas of orthographic projections of the plurality of filter units 1021 onto the base substrate 101. In this way, the filter units 1021 can completely cover the corresponding hollowed-out regions and extend beyond the corresponding hollowed-out regions, so as to avoid or reduce light leakage and light crosstalk, and improve the display effect.

Among the plurality of filters 1024, the filters 1024 closest to the edge of the base substrate 101 are edge filters 1025, and the other filters 1024 are non-edge filters 1026. An overlapping area between an orthographic projection of any one of the edge filters 1025 onto the base substrate 101 and the orthographic projection of the shading layer 103 onto the base substrate 101 is greater than an overlapping area between an orthographic projection of any one of the non-edge filters 1026 onto the base substrate 101 and the orthographic projection of the shading layer 103 onto the base substrate 101. The orthographic projection of the sealant 2 onto the base substrate 101 is located within the orthographic projection of the shading layer 103 onto the base substrate 101.

Figure 14:
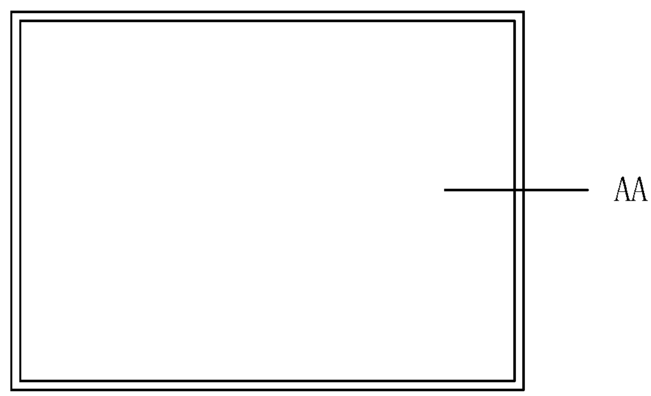
FIG. 14 is a schematic structural diagram illustrating a display apparatus according to an embodiment of the present application.

Based on the same inventive concept, an embodiment of the present application provides a display apparatus. As shown in FIG. 14, the display apparatus includes the display panel according to the above embodiments. The display apparatus according to this embodiment has the beneficial effects of the display panel according to the above embodiments, which will not be repeated herein.

Figure 15:
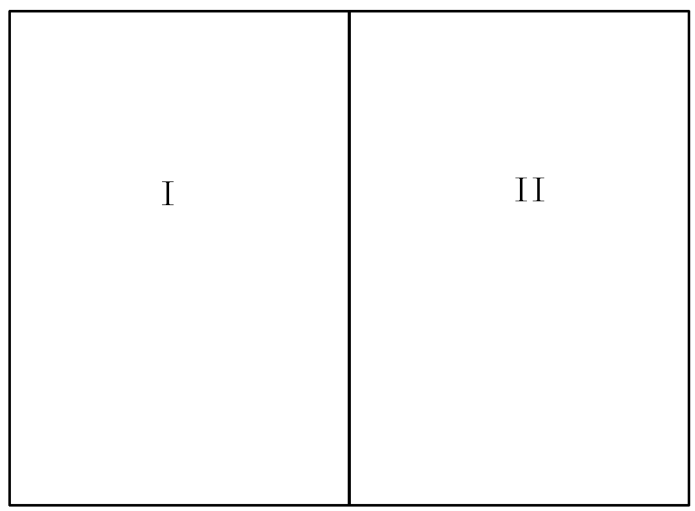
FIG. 15 is a schematic structural diagram illustrating a display apparatus according to another embodiment of the present application.

Optionally, the display apparatus according to the present embodiment includes a plurality of display panels spliced with each other. For example, as shown in FIG. 15, the display apparatus may include a first display panel I and a second display panel II. That is, the display apparatus according to the present embodiment is a spliced display apparatus. Since the color filter layer at the corner of the color filter substrate according to the present application is designed, yellowing at four corners of the display apparatus can be effectively avoided while achieving a narrow frame. Thus, the display panel is particularly applicable to a spliced display apparatus. However, in other embodiments, the display panel can be applied to other types of display apparatuses.

With the embodiments of the present application, at least the following beneficial effects can be produced.

With the color filter substrate, the display panel, and the display apparatus according to the embodiments of the present application, a shape of the color filter layer at the corner region of the display area is designed such that the color filter layer at the corner region is spaced apart from the sealant, which can prevent the sealant from overlapping with the color filter layer at the corner region, thus ensuring uniform thickness and relatively even support at the sealant after the color filter substrate and the array substrate are bonded. As a result, yellowing at four corners of the display panel can be avoided while achieving a narrow frame.

In the description of the present application, it should be understood that orientation or positional relationship indicated by terms such as "center", "upper", "lower", "front", "rear", "left", "right", "vertical", "horizontal", "top", "bottom", "inner", and "outer" is based on the drawings, and is only for convenience of description of the present application and simplification of the description, rather than indicating or implying that the apparatus or element referred to must have a specific orientation, or be configured and operated in a specific orientation, and therefore the terms cannot be construed as limiting the present application.

The terms "first" and "second" are only used for descriptive purposes, and are not to be understood as indicating or implying relative importance or implicitly indicating the number of technical features indicated. Thus, the features defined by the term such as "first" or "second" may explicitly or implicitly include one or more of these features. In the description of the present application, the term "a plurality of" means two or more unless otherwise specified.

In the description of the present application, it should be noted that, unless otherwise expressly specified and defined, the terms "install", "connect", and "couple" should be understood in a broad sense, for example, it may be fixed connection, detachable connection, or integrated connection, it may be direct connection or indirect connection through an intermediate medium, or it may be internal communication between two elements. For those ordinary skilled in the art, the specific meaning of the above-mentioned terms in the present application may be understood in a specific context.

In the description of this specification, features, structures, materials, or characteristics may be combined in any one or more of the embodiments or examples in any suitable manner.

It should be understood that, though various steps in the flowcharts of the drawings are shown in sequence as indicated by arrows, these steps are not necessarily executed in sequence in the order indicated by the arrows. Unless explicitly stated herein, the order in which these steps are executed is not strictly limited, and they can be executed in other orders. Moreover, at least part of the steps in the flowcharts of the drawings may include multiple sub-steps or stages. These sub-steps or stages are not necessarily executed at the same time, but may be executed at different times, and are not necessarily executed in sequence, but may be executed in turn or alternately with at least part of other steps or sub-steps or stages of other steps.

The above are only some of the embodiments of the present application. It should be noted that those ordinary skilled in the art may make several improvements and modifications to the present application without departing from the principles of the present application, and these improvements and modifications also fall within the protection scope of the present application.

What is claimed is:

1. A display panel, comprising an array substrate and a color filter substrate disposed opposite to each other, the array substrate being provided with a plurality of pixel regions arranged in an array, and the pixel regions closest to corners of the array substrate among the plurality of pixel regions being first-type pixel regions, wherein the color filter substrate comprises:

a base substrate;

a sealant between the base substrate and the array substrate, an orthographic projection of the sealant onto the array substrate at least partially overlapping with the first-type pixel regions; and a color filter layer on the base substrate and comprising a plurality of filter units disposed corresponding to the plurality of pixel regions, wherein the filter units comprises first filter units corresponding to the first-type pixel regions, and for each of the first filter units, a portion of an orthographic projection of the first filter unit onto the base substrate facing a corner of the base substrate has a non-right-angle contour, and the orthographic projection of the first filter unit onto the base substrate does not overlap with an orthographic projection of the sealant onto the base substrate.

2. The display panel of claim 1, wherein the portion of the orthographic projection of the first filter unit onto the base substrate facing the corner of the base substrate is a curve segment.

3. The display panel of claim 2, wherein the portion of the orthographic projection of the first filter unit onto the base substrate facing the corner of the base substrate is an arc segment with a constant curvature.

4. The display panel of claim 3, wherein the arc segment has a radius of curvature greater than or equal to 0.5 mm and less than or equal to 5 mm.

5. The display panel of claim 4, wherein a central angle corresponding to the arc segment is 90°.

6. The display panel of claim 1, wherein the portion of the orthographic projection of the first filter unit onto the base substrate facing the corner of the base substrate is a line segment with a constant slope.

7. The display panel of claim 6, wherein the slope is 1.

8. The display panel of claim 1, wherein each of the filter units comprises a first filter, a second filter, and a third filter, the first filter being made of a first color resist material, the second filter being made of a second color resist material, and the third filter being made of a third color resist material; and wherein a connecting portion is disposed between at least some of adjacent filter units, and the connecting portion is made of the first color resist material.

9. The display panel of claim 8, wherein the first color resist material has a higher stability than the second color resist material and the third color resist material.

10. The display panel of claim 8, wherein the connecting portion and the first filter are arranged in a same layer.

11. The display panel of claim 10, wherein the filter units comprises second filter units which are not corresponding to the first-type pixel regions, and a structure formed by the connecting portion and corresponding first filters surrounds the second filter and the third filter in a corresponding second filter unit.

12. The display panel of claim 11, wherein a minimum distance between the first filter unit and the sealant is greater than or equal to a minimum distance between the second filter unit and the sealant.

13. The display panel of claim 12, wherein a part of the orthographic projection of the sealant onto the array substrate overlapping with the first-type pixel regions has a curve segment.

14. The display panel of claim 8, wherein there are a plurality of connecting portions arranged at intervals in a first direction, each of which extends in a second direction, wherein an angle is formed between the first direction and the second direction; and wherein among the plurality of connecting portions, the connecting portions closest to edges of the base substrate are edge connecting portions, and other connecting portions are non-edge connecting portions.

15. The display panel of claim 14, wherein the color filter substrate further comprises a shading layer formed on the base substrate, and at least part of the color filter layer and the sealant are formed on the shading layer; and wherein a dimension of an overlapping area of an orthographic projection of each of the edge connecting portions onto the base substrate with an orthographic projection of the shading layer onto the base substrate in the first direction is no more than a dimension of an overlapping area of an orthographic projection of each of the non-edge connecting portions onto the base substrate with the orthographic projection of the shading layer onto the base substrate in the first direction.

16. The display panel of claim 1, wherein the color filter substrate further comprises a shading layer formed on the base substrate, and at least part of the color filter layer and the sealant are formed on the shading layer; and wherein a plurality of hollowed-out regions arranged in an array are provided in the shading layer, and a sum of areas of orthographic projections of the plurality of hollowed-out regions onto the base substrate is smaller than a sum of areas of orthographic projections of the plurality of filter units onto the base substrate.

17. The display panel of claim 1, wherein the color filter substrate further comprises a shading layer formed on the base substrate, and at least part of the color filter layer and the sealant are formed on the shading layer;

wherein each of the filter units comprises a plurality of filters, and among the plurality of filters, the filters closest to edges of the base substrate are edge filters, and other filters are non-edge filters; and wherein an overlapping area between an orthographic projection of each of the edge filters onto the base substrate and an orthographic projection of the shading layer onto the base substrate is greater than an overlapping area between an orthographic projection of each of the non-edge filters onto the base substrate and the orthographic projection of the shading layer onto the base substrate.

18. A display apparatus, comprising the display panel of claim 1.

* * * * *